(12) United States Patent
Davis et al.

(10) Patent No.: US 9,550,574 B2
(45) Date of Patent: Jan. 24, 2017

(54) VENTILATION SYSTEM AND METHOD OF ASSEMBLY

(75) Inventors: Allen Davis, Guyton, GA (US); Kristopher Lynch, Pooler, GA (US); Adam White, Pooler, GA (US); J. R. Grovenstein, Pooler, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 1135 days.

(21) Appl. No.: 13/288,796

(22) Filed: Nov. 3, 2011

(65) Prior Publication Data

US 2013/0115868 A1 May 9, 2013

(51) Int. Cl.
*B64D 13/00* (2006.01)
*B60H 1/34* (2006.01)

(52) U.S. Cl.
CPC ............ *B64D 13/00* (2013.01); *B60H 1/3442* (2013.01); *B60H 2001/3478* (2013.01); *B64D 2013/003* (2013.01); *Y10T 29/49826* (2015.01)

(58) Field of Classification Search
CPC .......................... B64D 13/00; B64D 2013/003
USPC ...................................................... 454/75, 76
See application file for complete search history.

(56) References Cited

U.S. PATENT DOCUMENTS

| | | | |
|---|---|---|---|
| 2,441,088 A * | 5/1948 | Teague, Jr. | B64D 13/02 137/505.3 |
| 2,516,805 A * | 7/1950 | Rother | B64D 13/00 454/76 |
| RE23,445 E * | 12/1951 | Teague, Jr. | B64D 13/02 454/73 |
| 2,596,909 A * | 5/1952 | Ross | B60H 1/3442 239/457 |
| 2,854,913 A * | 10/1958 | Brahm | B64D 13/00 137/81.1 |
| 3,436,522 A * | 4/1969 | Carkhuff et al. | 219/137.42 |
| 3,952,773 A * | 4/1976 | Hahn | A62B 9/027 128/204.25 |
| 4,396,157 A * | 8/1983 | Inculet et al. | 239/598 |
| 5,099,752 A * | 3/1992 | Bosley | B60H 1/00257 454/131 |

(Continued)

OTHER PUBLICATIONS

The International Bureau of WIPO, International Preliminary Report on Patentability mailed May 15, 2014 for International Application No. PCT/US2012/063222.

(Continued)

*Primary Examiner* — Alissa Tompkins
*Assistant Examiner* — Frances F Hamilton
(74) *Attorney, Agent, or Firm* — Lorenz & Kopf, LLP (LKGlobal)

(57) ABSTRACT

A ventilation system for ventilating a passenger compartment of an aircraft is disclosed herein. The ventilation system includes, but is not limited to, a nozzle that is adapted to be mounted proximate an interior of the aircraft and that is configured to direct a stream of air into the passenger compartment. The ventilation system further includes a valve that is spaced apart from the nozzle and positioned upstream of the nozzle, the valve configured to control a flow of air to the nozzle. The ventilation system still further includes a conduit that fluidly couples the valve to the nozzle. The conduit is configured to convey the flow of air from the valve to the nozzle.

12 Claims, 6 Drawing Sheets

(56) References Cited

U.S. PATENT DOCUMENTS

| | | | | |
|---|---|---|---|---|
| 5,338,254 | A * | 8/1994 | Farrington | F24F 13/072 454/256 |
| 5,695,396 | A * | 12/1997 | Markwart | B64D 13/00 454/71 |
| 6,619,589 | B2 * | 9/2003 | Brasseur | B60H 1/00371 244/118.5 |
| 8,016,211 | B2 * | 9/2011 | Barr | F01D 17/141 239/265.19 |
| 8,795,041 | B2 * | 8/2014 | Saito | B64D 11/06 128/204.22 |
| 2005/0064809 | A1 * | 3/2005 | Thomassin et al. | 454/76 |
| 2007/0074930 | A1 * | 4/2007 | Tomerlin et al. | 181/252 |
| 2009/0230212 | A1 * | 9/2009 | Barr | F01D 17/141 239/265.19 |
| 2010/0043794 | A1 * | 2/2010 | Saito | B64D 11/06 128/204.22 |
| 2010/0093267 | A1 * | 4/2010 | Hogh et al. | 454/76 |
| 2010/0240290 | A1 * | 9/2010 | Markwart | B64D 13/00 454/71 |
| 2011/0240796 | A1 * | 10/2011 | Schneider | B64D 11/00 244/118.5 |
| 2012/0067983 | A1 * | 3/2012 | Czingon | C21C 5/4606 239/589 |
| 2012/0186282 | A1 * | 7/2012 | Army | B64D 13/00 62/93 |

OTHER PUBLICATIONS

International Searching Authority, PCT International Search Report and Written Opinion mailed Jun. 28, 2013 in International Application No. PCT/US2012/063222.

State Intellectual Property Office of the People's Republic of China, Office Action received for Application No. 201280054124.7 dated Jul. 1, 2015.

* cited by examiner

VENTILATION SYSTEM AND METHOD OF ASSEMBLY

TECHNICAL FIELD

The present invention generally relates to a ventilation system and a method of assembling a ventilation system.

BACKGROUND

A modern passenger aircraft commonly includes a ventilation system that is configured to direct a stream of cooled (or heated) air towards each passenger onboard the aircraft. Typically, each passenger is presented with an adjustable nozzle that is mounted in an overhead compartment and which the passenger can manipulate and reposition to control the direction of the stream of air. For example, the nozzle may be configured as a sphere and may be mounted in a ball socket in the overhead compartment. By moving the spherical nozzle in the ball socket, the passenger can control the direction of the stream of air.

The nozzle also includes an integrated valve that the passenger may open and/or close at will. Commonly, the valve is a pintle valve that includes a pintle and an opening that is configured to engage with, and to be obstructed by, the pintle. As the passenger unscrews and/or screws an actuator on the nozzle, the pintle is retracted and/or extended causing the pintle valve to open and/or close, respectively. When the pintle valve is opened, the stream of air flows out of the nozzle and when the pintle valve is closed, the stream of air is cut off. Accordingly, the conventional ventilation system described above allows each passenger to turn the stream of air on and off at will and to direct the stream of air towards a desired target. This level of control provides for the comfort of the passengers. This style of adjustable ventilation is commonly referred to as a 'gasper' in aviation applications.

Another feature of the above described ventilation system that aircraft passengers have found satisfying is the relatively high velocity of the stream of air that is produced by such a ventilation systems. The production of a relatively high velocity stream of air has proven to be very effective at cooling/warming passengers in the aircraft's cabin. The high velocity of the stream of air is typically achieved as a result of the nozzle's configuration. In a conventional nozzle, an upstream portion of the nozzle has a larger diameter than a downstream portion of the nozzle. Accordingly, as a relatively low speed flow of air enters the nozzle, the area of the passageway through which the flow of air passes begins to constrict. This constriction tightens as the flow of air continues down stream through the nozzle. This constriction causes the flow of air to accelerate as the flow of air moves through the nozzle in order to maintain a constant mass-flow rate.

While the above described ventilation system is adequate, there is room for improvement. The movement and the acceleration of the flow of air through the nozzle causes the emission of an appreciable hissing sound as the stream of air exits the nozzle. In many applications, the hissing sound made by the ventilation system is not appreciably louder than the background noise in the cabin of an aircraft and is therefore acceptable. However, some aircraft (e.g., privately owned corporate jets) are designed, constructed, and/or configured to provide a reduced level of background noise within the cabin during aircraft operations as compared with conventional commercial aircraft. In such aircraft, the noise generated by the ventilation system may be quite noticeable and/or unacceptable to potential customers.

Previous attempts to quiet the ventilation system have included the use of different types of valves in the nozzle. Other attempts have included reducing the air pressure of the air flowing past the valve which, in turn, yields a lower speed stream of air. These solutions have not been effective. For example, while the use of different types of valves in the nozzle has, to some extent, yielded reduced decibel readings at the nozzle's exit, such volume reductions have been insufficient. Additionally, while the reduction of the air pressure of the air flowing through the nozzle has proven effective at reducing the decibel level of the noise produced by the stream of air exiting the nozzle, such reduction of air pressure greatly reduced the speed of the stream of air exiting the nozzle. Such a reduction in the speed of the stream of air exiting the nozzle has resulted in an unacceptable diminution in the effectiveness of the ability of the stream of air to cool/warm aircraft passengers.

Accordingly, it is desirable to provide a ventilation system that produces a relatively quiet, high speed stream of air. In addition, it is desirable to provide a method for assembling such a ventilation system. Furthermore, other desirable features and characteristics will become apparent from the subsequent detailed description and the appended claims, taken in conjunction with the accompanying drawings and the foregoing technical field and background.

BRIEF SUMMARY

A ventilation system for ventilating a passenger compartment of an aircraft and a method for assembling a ventilation system for ventilating a passenger compartment of an aircraft is disclosed herein.

In a first non-limiting embodiment, the ventilation system includes, but is not limited to, a nozzle that is adapted to be mounted proximate an interior of the aircraft and that is configured to direct a stream of air into the passenger compartment. The ventilation system further includes a valve that is spaced apart from the nozzle and that is positioned upstream of the nozzle. The valve is configured to control a flow of air to the nozzle. The ventilation system still further includes a conduit that fluidly couples the valve to the nozzle. The conduit is configured to convey the flow of air from the valve to the nozzle.

In another non-limiting embodiment, the ventilation system includes, but is not limited to, a nozzle that is adapted to be mounted proximate an interior of the aircraft and that is configured to direct a stream of air into the passenger compartment. The ventilation system further includes a valve that is spaced apart from the nozzle and that is positioned upstream of the nozzle. The valve is configured to control a flow of air to the nozzle. The ventilation system further includes a conduit that fluidly couples the valve to the nozzle. The conduit is configured to convey the flow of air from the valve to the nozzle. The ventilation system still further includes a muffler that is fluidly coupled with the conduit such that the flow of air passes through muffler. The muffler is configured to absorb sound energy from the flow of air when the flow of air flows through the muffler.

In another non-limiting embodiment, the method includes the step mounting a nozzle proximate the passenger compartment of the aircraft such that the nozzle is arranged to vent into the passenger compartment. The method further includes the step of positioning a valve proximate the passenger compartment in a location that is spaced apart from the nozzle. The method still further includes the step of connecting a conduit between an output of the valve an inlet of the nozzle such that the valve and nozzle are fluidly coupled with one another via the conduit and configured to provide ventilation to the passenger compartment of the aircraft.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved ventilation system is disclosed herein. As compared with conventional ventilation systems, the ventilation system of the present disclosure removes the valve from the nozzle and repositions the valve upstream in the flow of air. As used herein, the term "upstream" shall refer a direction that is opposite to the direction of the flow of air through the ventilation system and the term "downstream" shall refer to a direction that is the same as the direction of the flow of air through the ventilation system. By positioning the valve upstream in the flow of air, the noise that is generated by the flow of air passing through the valve (e.g., as a result of turbulence) is remote from the nozzle and has the opportunity to dissipate as the air travels from the valve to the nozzle. By putting this added distance between the mechanism where the majority of the undesirable noise is generated and the opening where the undesirable noise is emitted into the passenger cabin, the decibel level or volume of the undesirable noise that is audible to a passenger in the cabin is substantially diminished. Additional modifications make it possible to lower the volume of the undesirable noise even further. For example, in some embodiments, the ventilation system will include a muffler positioned between the valve and the nozzle. In other embodiments, a pintle may be positioned in the nozzle to cause the flow of air to accelerate further upstream of where it otherwise would. The acceleration of the flow of air into the high velocity stream of air at the nozzle can generate undesirable noise. By using the pintle to move the acceleration upstream, the volume of the undesirable noise that reaches a passenger will be diminished.

A greater understanding of the ventilation system described above and of the method for assembling the ventilation system may be obtained through a review of the illustrations accompanying this application together with a review of the detailed description that follows.

Figure 1:
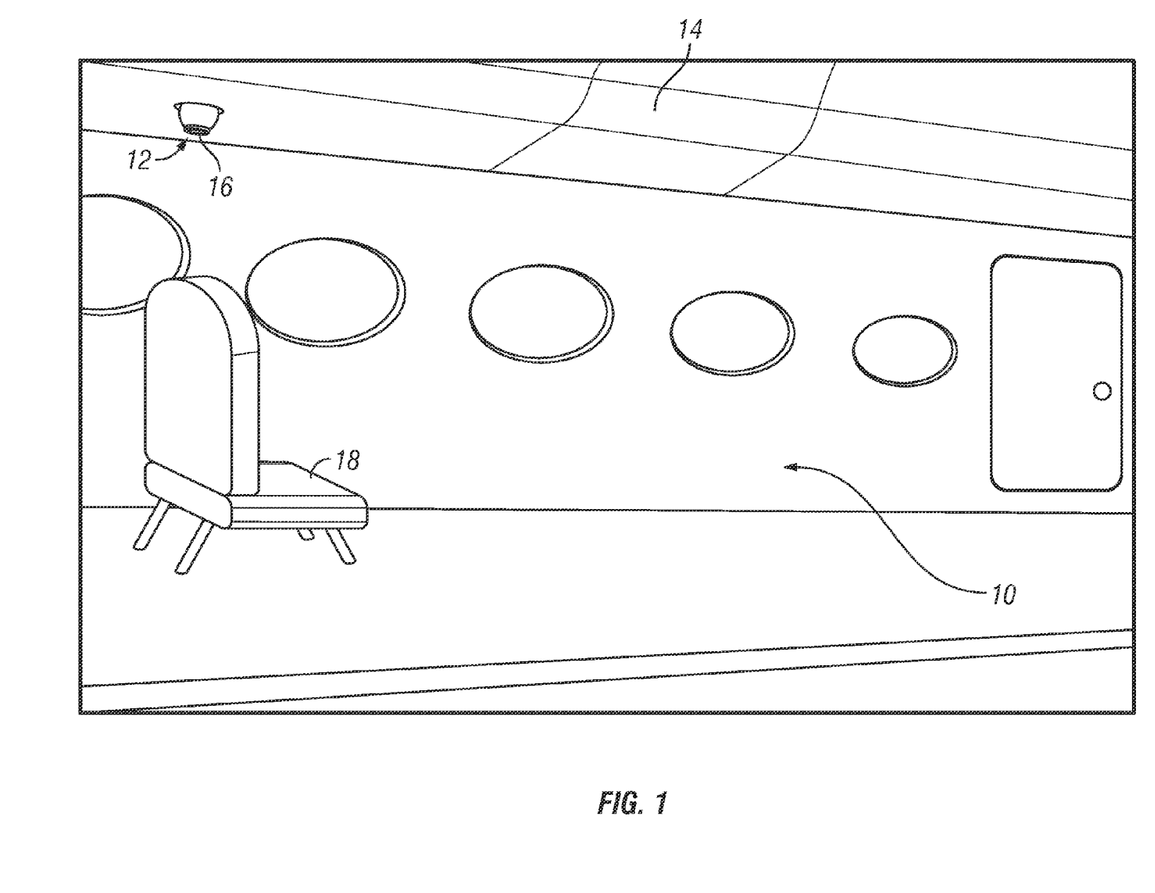
FIG. 1 is an environmental view illustrating an interior of a cabin compartment of an aircraft that includes an embodiment of a ventilation system made in accordance with the teachings of the present disclosure.

FIG. 1 is an environmental view illustrating an interior portion of a cabin compartment 10 of a privately owned business jet. Although the context of the discussion contained herein is with respect to a privately owned business jet, it should be understood that the teachings of the present disclosure are compatible with all types of aircraft including, but not limited to, private propeller driven aircraft, private jets, commercial jet passenger aircraft, commercial propeller driven passenger aircraft, cargo aircraft, military aircraft, and the like. Furthermore, although the ventilation system disclosed herein is described as being compatible for use on board an aircraft, it should be understood that the present ventilation system is compatible with all types of vehicles. For example, and without limitation, the ventilation system disclosed herein may be implemented on board automobiles, buses, trains, ships, spacecraft, and any other type of conveyance. Additionally, the ventilation system disclosed herein is not limited to implementation on vehicles, but may also be compatible for use in tents, houses, buildings, stadiums, theaters, and other permanent and/or semi-permanent structures.

Cabin compartment 10 includes an embodiment of a ventilation system 12 made in accordance with the teachings of the present disclosure. In the illustrated embodiment, ventilation system 12 is housed in an overhead compartment 14 which is configured to house ventilation system 12 as well as other equipment needed to support ventilation system 12 and to support operation of the aircraft. Ventilation system 12 includes a nozzle 16. Nozzle 16 has a ball-in-socket type of arrangement with a nozzle mount (not shown in FIG. 1) that permits a passenger to manipulate nozzle 16 and, in turn, to direct the stream of air emitted by ventilation system 12 towards a desired area.

A passenger seat 18 is positioned below ventilation system 12 and is configured to receive a passenger of the aircraft. In the illustrated embodiment, a single ventilation system 12 is devoted to cooling and/or heating the passenger of a single passenger seat 18. In other embodiments, multiple ventilation systems 12 may be configured to direct streams of air towards a single passenger seat 18. In still other embodiments, a single ventilation system 12 may be configured to provide multiple streams of air to multiple passenger seats 18.

Figure 2:
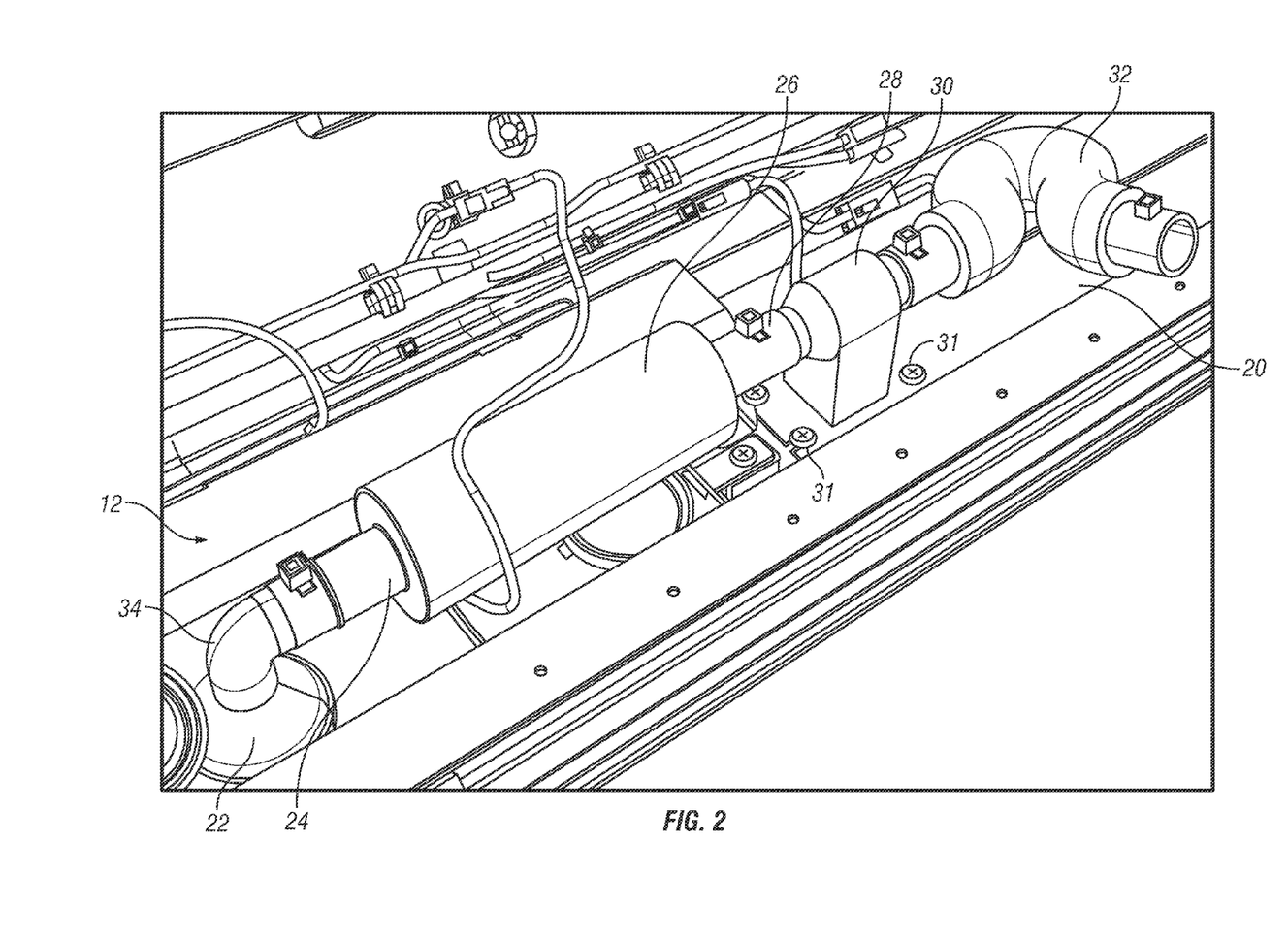
FIG. 2 is a perspective view illustrating an interior portion of an overhead cabinet housing an embodiment of the ventilation system of the present disclosure.

With continuing reference to FIG. 1, FIG. 2 is a perspective view illustrating an interior portion of overhead compartment 14. Ventilation system 12 is mounted to a bottom panel 20 of overhead compartment 14. Ventilation system 12 includes a nozzle 16 (see FIG. 1), a nozzle mount 22, a hose segment 24, a muffler 26, a hose segment 28, and an electronically actuatable valve 30.

Nozzle mount 22 and nozzle 16 are coupled to one another in a ball-in-socket arrangement and, accordingly, nozzle 16 is able to swivel with respect to nozzle mount 22 about both an X axis and a Y axis. Accordingly, a passenger seated below nozzle 16 can reach up and, at will, direct a stream of air emitted by nozzle 16 towards a desired area. Nozzle mount 22 may include one or more openings to receive a fastener that can be used to secure nozzle mount 22 to bottom panel 20.

Extending out of a rear portion of nozzle mount 22 is a tube segment 34. Tube section 34 is curved to direct the flow of air from hose segment 24 into nozzle mount 22. Nozzle mount 22, nozzle 16, and tube segment 34 may be constructed from any suitable material including, but not limited to, plastics, metals, polymeric materials, and any other suitable material that is effective to contain a flow of air as it passes through each respective component.

Hose segment 24 and hose segment 28 may comprise any type of conventional hosing that is effective to contain and direct a flow of air. Hose segment 24 and hose segment 28 may be constructed of any suitable material including, but not limited to, rubbers, plastics, and polymeric materials. In other embodiments, hose segment 24 and hose segment 28 may not comprise a hose segment, but rather, may comprise a tube segment or other type of conduit that is configured to contain and direct a flow of air. Accordingly, in some embodiments, hose segment 24 and hose segment 28 may be comprised of materials, such as rubber, that render hose segment 24 and hose segment 28 substantially flexible while in other embodiments, hose segment 24 and hose segment 28 may be comprised of metal which render hose segment 24 and hose segment 28 substantially rigid. In the illustrated embodiment, hose segment 24 is connected at one end to tube segment 34 and is connected at an opposite end to muffler 26.

Muffler 26 is configured as a straight-through muffler. Accordingly, muffler 26 does not include baffles or other obstructions typically found in mufflers. Rather, muffler 26 has a substantially hollow interior that may be dimensioned, contoured, and constructed of materials that are configured to reduce the volume of the undesired sound generated by the flow of air through electronically actuatable valve 30. Such sound-reducing techniques, designs, and configurations are well known to those of ordinary skill in the art. As discussed above, one end of muffler 26 is connected to hose segment 24. The opposite end of muffler 26 is connected to hose segment 28.

Electronically actuatable valve 30 may comprise any type of valve that is effective to control (i.e., selectively permit and inhibit) the flow of air. For example, in some embodiments, electronically actuatable valve 30 may comprise a poppet valve or a flapper valve. Electronically actuatable valve 30 includes electronic components (such as solenoids) that are well known in the art and that permit electronically actuatable valve 30 to be actuated electronically and/or remotely. Configured in this manner, the flow of air through ventilation system 12 can be selectively stopped and started remotely by a passenger or other user. In other embodiments, ventilation system 12 may not utilize an electronically actuatable valve, but rather, may utilize a mechanically actuated valve without departing from the teachings of the present disclosure.

In the illustrated embodiment, electronically actuatable valve 30 is secured by a plurality of threaded fasteners 31 to bottom panel 20. A downstream portion of electronically actuatable valve 30 is connected to hose segment 28 while an upstream portion of electronically actuatable valve 30 is connected to a hose 32 that is configured to supply pressurized air. Accordingly, when electronically actuatable valve 30 is opened, a pressure difference between the air on the downstream side of electronically actuatable valve 30 (low pressure) and the air on the upstream side of electronically actuatable valve 30 (high pressure) causes the air to flow downstream through electronically actuatable valve 30.

As illustrated in FIG. 2, the pressurized air supplied by hose 32 will travel through electronically actuatable valve 30, through hose segment 28, through muffler 26, through hose segment 24, through nozzle mount 22, and through nozzle 16 before entering cabin compartment 10. Electronically actuatable valve 30 has been spaced apart from nozzle 16 by hose segment 24, muffler 26, and hose segment 28. Arranged in this manner, any undesired sound generated by the flow of air supplied by hose 32 as it passes over the internal components of electronically actuatable valve 30 will have ample opportunity to dissipate before entering cabin compartment 10. Additionally, as discussed above, muffler 26 is designed and configured to further suppress the transmission of undesired sound through ventilation system 12 into cabin compartment 10. Accordingly, when the flow of air passing through ventilation system 12 is emitted at nozzle 16 as a relatively high-speed stream of air, such emissions will be relatively quiet as compared with the stream of air emitted by conventional ventilation systems. In other embodiments, ventilation system 12 may not include muffler 26. In such systems, the spacing apart of nozzle 16 from electronically actuatable valve 30 (or from a mechanical valve if a mechanical valve is used) will, by itself, substantially reduce the volume of undesired noise emitted from nozzle 16. In such systems, any amount of distance between nozzle 16 and electronically actuatable valve 30 may be sufficient to quiet the system or to at least reduce the noise caused by operation of the system.

Figure 3:
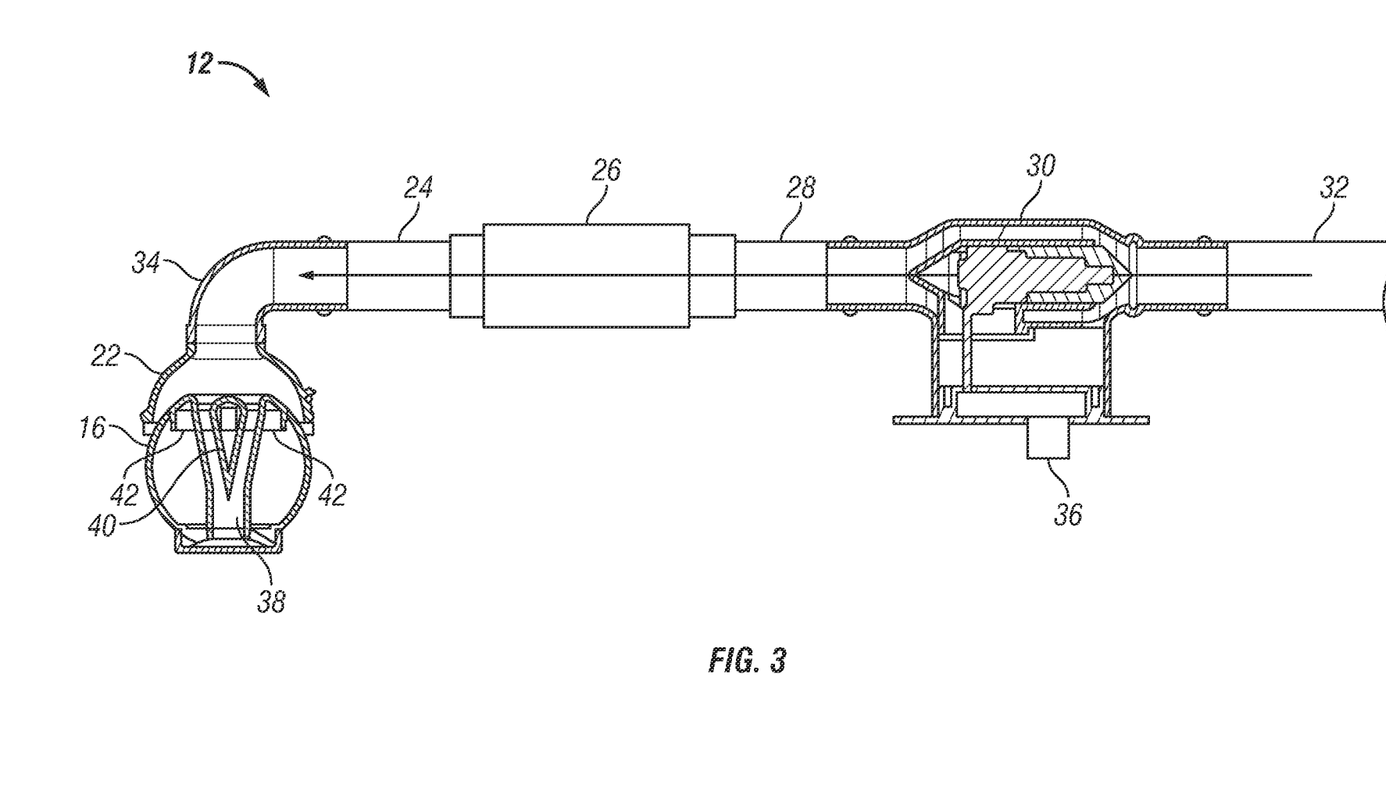
FIG. 3 is a schematic view illustrating the ventilation system of FIG. 2.

FIG. 3 is a schematic view illustrating ventilation system 12. With continuing reference to FIGS. 1-2, in FIG. 3, electronically actuatable valve 30 and nozzle 16 are depicted in greater detail. In the illustrated embodiment, electronically actuatable valve 30 is depicted as being a poppet valve. A pushbutton switch 36 that is configured to actuate electronically actuatable valve 30 is connected to electronically actuatable valve 30. Pushbutton switch 36 extends below electronically actuatable valve 30 and is accessible to a passenger seated within cabin compartment 10. Pushbutton switch 36 is electrically connected to a mechanism (e.g., a solenoid) integrated into electronically actuatable valve 30 that will, when energized, open, close, and/or partially open electronically actuatable valve 30. It should be understood that although pushbutton switch 36 has been depicted as being a push button type of switch, any other type of switch that is effective to selectively energize electronically actuatable valve 30 may also be used without departing from the teachings of the present disclosure.

FIG. 3 also illustrates nozzle 16 in greater detail. As illustrated, nozzle 16 has a generally spherical configuration which allows nozzle 16 to be swiveled about both an X axis and a Y axis with respect to nozzle mount 22. This provides a passenger in a cabin compartment 10 great freedom and flexibility in selecting a direction for the stream of air emitted by nozzle 16. The internal components of nozzle 16 are also depicted. For example, nozzle 16 includes a pathway 38 configured to guide and accelerate the flow of air passing through ventilation system 12 to form the relatively high-speed stream of air emitted by nozzle 16. Nozzle 16 is also fitted with a pintle 40 that is positioned at an upstream portion of pathway 38. Pintle 40 is substantially axisymmetric and contoured to have the general profile of an airfoil. Pintle 40 is held in place in pathway 38 via a plurality of tab members 42. Pathway 38, pintle 40, and tab members 42 will be discussed in greater detail below.

Figure 4:
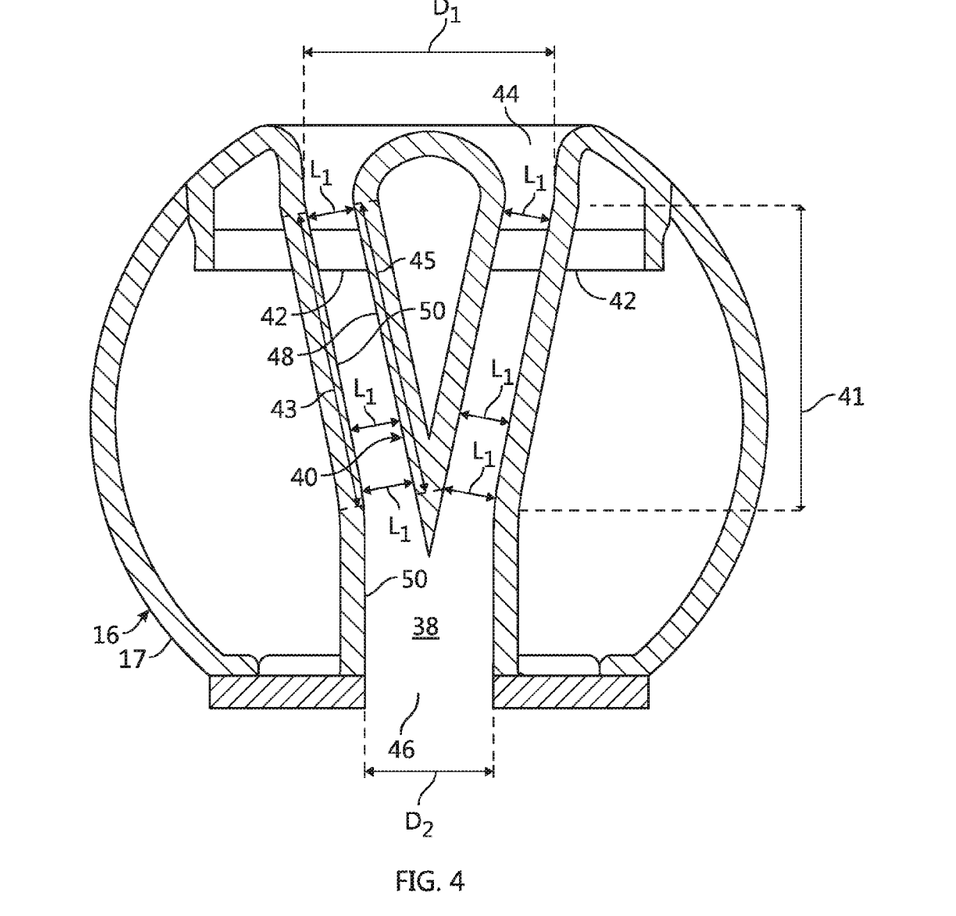
FIG. 4 is a more detailed cross-sectional view illustrating a nozzle of the ventilation system of FIG. 3.

FIG. 4 is a more detailed cross-sectional view illustrating nozzle 16. Nozzle 16 includes an inlet 44 positioned at an upstream end of nozzle 16. Nozzle 16 further includes an outlet 46 positioned at a downstream end of nozzle 16. Pathway 38 extends from inlet 44 to outlet 46 and has a substantially circular cross section along its axial length. Accordingly, inlet 44 is substantially circular and has a diameter of $D_1$ and outlet 46 is substantially circular and has a diameter $D_2$. As illustrated, $D_1$ is larger than $D_2$. Accordingly, as the flow of air travels downstream through pathway 38, it will encounter a narrowing pathway that will constrict its flow. The relationship between mass flow rate, velocity, and cross-sectional area is well known and is represented by the following equation:

$$R = A * V$$

In the above equation, the variable R represents mass flow rate, the variable A represents the cross-sectional area of the conduit through which the air is flowing, and the variable V represents the velocity of the air flow. In ventilation system 12, the mass flow rate remains substantially constant because the difference between $D_1$ and $D_2$ and the corresponding difference between the cross-sectional area of inlet 44 and the cross sectional area of outlet 46 is not severe enough to substantially impact mass flow rate. Accordingly, as the flow of air passes through nozzle 16, the flow of air will accelerate to a higher velocity as it encounters the narrowing cross-sectional area of pathway 38 in order to maintain a constant mass flow rate. Once the flow of air has reached outlet 46, it is moving with a substantially higher velocity than it had when it entered inlet 44. From the equation above, the velocity of the air flowing exiting nozzle 16 is dependent upon the cross-sectional area of outlet 46 and can be calculated with relative precision. This velocity will be referred to herein as the exit velocity.

The acceleration of the flow of air through a conventional ventilation system's nozzle contributes to the volume of undesired sound emitted by the ventilation system. Pintle 40 helps to combat this issue by moving the location where a portion of the acceleration occurs upstream. By moving a portion of the acceleration upstream, the undesired sounds generated by such acceleration are moved further away from a passenger who is situated in cabin compartment 10 and are thus less audible. Additionally, the upstream position of Pintle 40 provides the flow exiting the nozzle more distance to become fully developed and stable flow. Ensuring stable flow at the exit of the nozzle also contributes to a reduction in the undesired noise. Pintle 40 accomplishes this by serving as an obstruction to the flow of air as it enters inlet 44. The obstruction caused by pintle 40 reduces the cross-sectional area through which the flow of air may pass. This reduction in the cross-sectional area, as discussed above, will cause the air to accelerate to a higher velocity in order to maintain a constant mass flow rate. Accordingly, the flow of air entering inlet 44 is moving at a much higher velocity than it otherwise would be moving at if pintle 40 were not present.

As the flow of air continues to travel through nozzle 16, it will pass between a surface 48 of pintle 40 and a surface 50 of pathway 38 and will be further constricted by the diminishing cross sectional area of pathway 38. This diminishing cross sectional area of pathway 38 will further accelerate the flow of air up to the exit velocity. Because of the elevated velocity of the flow of air when it enters inlet 44 (as a result of pintle 40) and because of the corresponding diminution in the amount of acceleration that must be provided by pathway 38 to accelerate the flow of air up to the exit velocity, the volume of undesired sound emitted by nozzle 16 is lower than it would have been had nozzle 16 not included pintle 40.

There are additional noise-reducing benefits provided by pintle 40. For example, pintle 40 is configured to straighten the flow as it travels through the nozzle. This prevents vortices from being generated as the flow transitions from pathway 22 into inlet 44. This can be quite useful in instances where nozzle 16 is turned such that the direction of the flow of air into inlet 44 is out of alignment with pathway 38. Another benefit provided by pintle 40 is that it produces a more uniform velocity profile. The flow velocity at the boundaries will approach zero velocity and the velocity in the center of the flow will be the highest. The pintle causes the flow velocity to become more uniform as it develops into pathway 38 and exits through outlet 46. The resultant spectral content of the noise is shifted toward lower frequencies. This shift will both lower the peak noise level and will change the spectrum of the noise to blend into a similar spectral content of the aircraft cabin noise spectrum. This reduction of the peak noise level and blending of the spectral content will reduce the audibility of the noise because it becomes indistinguishable from the existing noise in the aircraft cabin.

In the illustrated embodiment, pintle 40 has a tapered contour such that the distance $L_1$ between surface 48 and surface 50 remains substantially constant as the air passes between surface 48 and surface 50. By keeping the distance between surface 48 and surface 50 constant, pintle 40 imparts no additional acceleration to the flow of air as it passes between these two surfaces. This configuration has been observed to result in the lowest decibel readings at outlet 46. In other embodiments, it may be desirable to vary the distance between surface 50 and surface 48 at different axial locations along pathway 38 and such variations may be implemented without departing from the teachings of the present disclosure. Other terminology may be used to refer to the structures illustrated in FIG. 4. For example, the section of nozzle 16 identified by reference numeral 41 may be referred to as a transitional section (i.e., transitional section 41). The segment of surface 50 identified with reference numeral 43 may be referred to as segment 43 and the segment of surface 48 identified by reference numeral 45 may be referred to as a segment 45. As illustrated, segment 43 corresponds with segment 45. In an embodiment, valve 16 is comprised of a pintle (40) and a valve body 17. The interior volume of valve body 17 forms an axisymmetrical narrowing pathway (pathway 38). Pintle 40 is retained axisymmetrically within the interior volume of valve body 17 by tabs 42, such that segment 45 is equidistant from segment 43.

Figure 5:
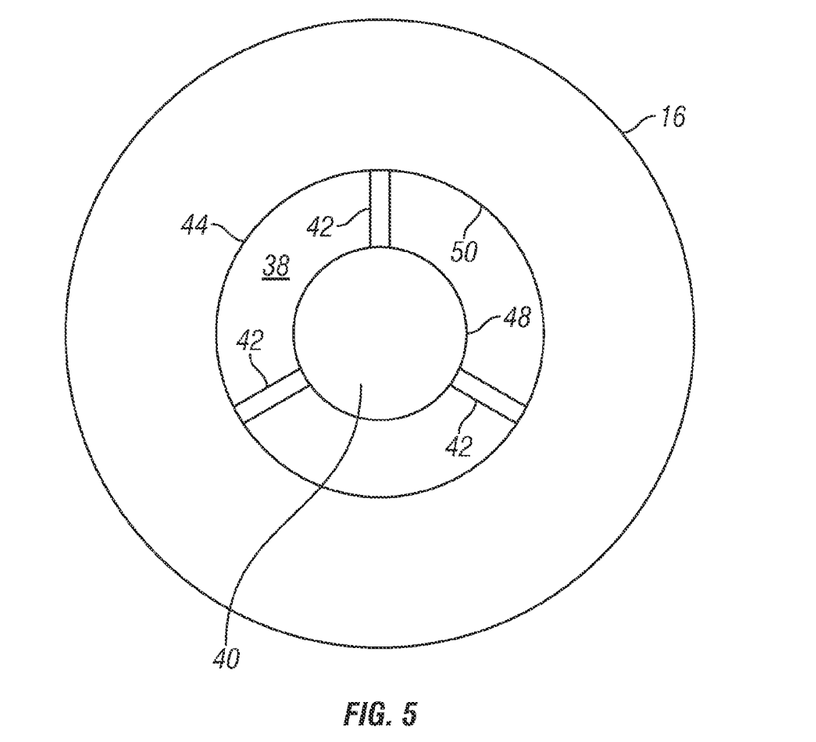
FIG. 5 is an axial view from above the nozzle of FIG. 3.

FIG. 5 is an axial view of an upstream portion of nozzle 16. In this view, the generally circular cross-sectional area of pathway 38 is plainly visible. With continuing reference to FIGS. 1-4, the flow of air entering inlet 44 encounters an obstruction in the form of pintle 40. The flow of air is therefore confined to travel between surface 48 of pintle 40 and surface 50 as it moves through nozzle 16. As discussed above, the presence of pintle 40 at inlet 44 causes a reduction in the cross-sectional area of inlet 44 which results in an acceleration of the flow of air.

Figure 6:
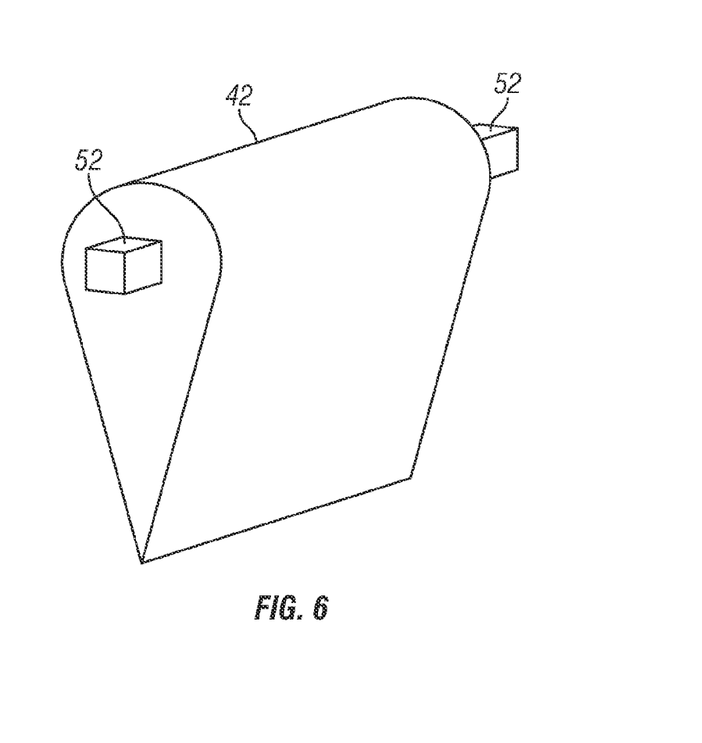
FIG. 6 is a perspective view illustrating an embodiment of a tab member for use with the nozzle of FIG. 3.

As illustrated in FIG. 5, pintle 40 is attached to nozzle 16 and is positioned within pathway 38 via tab members 42. In the illustrated embodiment, three tab members 42 have been utilized to attach pintle 40 to nozzle 16. In other embodiments, additional or fewer tab members 42 may be utilized. Tab members 42 extend radially across pathway 38 and will therefore encounter and partially obstruct the flow of air as the flow of air moves along pathway 38. As best seen in FIG. 6, tab members 42 are configured to have the contour of an airfoil to minimize the impact on the flow of air moving along pathway 38.

FIG. 6 is a perspective view illustrating tab member 42. With continuing reference to FIGS. 1-5, tab member 42 has been configured to have a cross-sectional configuration of an airfoil. Such a configuration will cause a relatively minimal disturbance in the flow of air as the flow of air moves through pathway 38. Tab member 42 includes a pair of engaging members 52 that facilitate the mounting of tab member 42 to nozzle 16. In other embodiments, additional engaging members may be provided to secure tab members 42 to nozzle 16.

Figure 7:
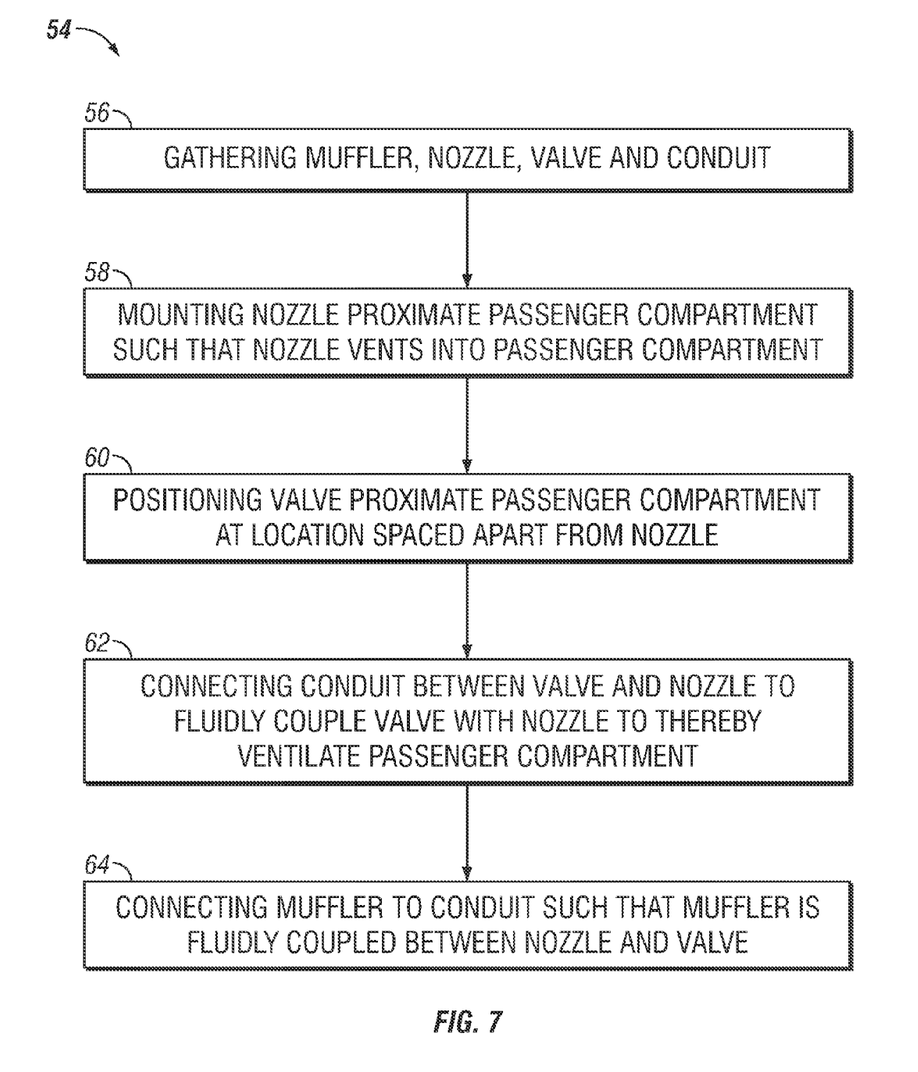
FIG. 7 is a flow diagram illustrating an embodiment of a method for assembling the ventilation system of FIG. 3.

FIG. 7 is a flow diagram illustrating an embodiment of a method 54 for assembling the ventilation system in accordance with the teachings of the present disclosure. With continuing reference to FIGS. 1-6, at step 56, a valve, a conduit, a nozzle, and a muffler are gathered. The valve may be a mechanical valve or an electronically actuatable valve. The conduit may be pipe, tubing, hose, or the like. In some embodiments, nozzle may comprise a standard nozzle such as those used on conventional ventilation systems while in other embodiments, the nozzle may be constructed to include a pintle as discussed and described above with respect to nozzle 16. The muffler may comprise any conventional straight-through muffler having a generally hollow or sound absorbing interior to trap sounds without impeding the flow of air. In some embodiments, the ventilation system may not include a muffler. In such embodiments, step 56 would not include the gathering the muffler for assembly.

At step 58, the nozzle is mounted proximate the passenger compartment of the aircraft such that the nozzle is arranged to vent into the passenger compartment. In some embodiments, the nozzle may be mounted in an overhead compartment disposed above a passenger seat. In other embodiments, the nozzle may be mounted behind any structure, panel, fixture, and/or compartment proximate the passenger compartment. For example, in some embodiments, it may be advantageous or preferable to mount the ventilation system under a floor panel or behind a wall panel.

At step 60, the valve is positioned proximate the passenger compartment at a location that is spaced apart from the nozzle. In some embodiments, the valve may be positioned behind and/or mounted to the same panel that the nozzle is mounted to. In other embodiments, the valve may be mounted to/positioned behind any other panel and/or compartment and may be positioned remotely from the nozzle.

At step 62, the conduit is connected between an output of the valve and an inlet of the nozzle such that the valve and nozzle are fluidly coupled with one another via the conduit. Accordingly, the valve, nozzle and conduit, which forms the ventilation system, is configured to provide ventilation to the passenger compartment of the aircraft. In some embodiments, the conduit may be configured to snap fit or otherwise engage the nozzle and the valve. In other embodiments, the conduit may be fitted to the nozzle and valve and then attached thereto using any suitable connector. Configured in the manner described, one end of the conduit is positioned to receive the flow of air from the valve and the other end of the conduit is positioned to deliver the flow of air to the nozzle. By assembling the ventilation system in this manner, the valve and the nozzle are spaced apart from one another, yet fluidly coupled. This will permit the transmission of fluid, such as a flow of air, from the valve to the nozzle while providing distance between two components. This distance will allow the undesired sound that is caused by the flow of air passing through the valve to dissipate before being discharged through nozzle.

At step 64, in embodiments where a muffler is utilized, the muffler is connected to the conduit such that the muffler is disposed between the valve and the nozzle and such that the muffler is fluidly coupled with both the nozzle and the valve. Arranged in this manner, the muffler is positioned to receive the flow of air from the valve and to transmit the flow of air to the nozzle. The presence of the muffler in the ventilation system will further enhance the ventilation system's ability to suppress the volume of undesired sound caused by the passage of the flow of air through the valve.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A ventilation system for ventilating a passenger compartment of an aircraft, the ventilation system comprising:
a nozzle adapted to be mounted proximate an interior of the aircraft and configured to direct a stream of air into the passenger compartment;
a valve spaced apart from the nozzle and positioned upstream of the nozzle, the valve configured to control a flow of air to the nozzle; and
a conduit fluidly coupling the valve to the nozzle, the conduit configured to convey the flow of air from the valve to the nozzle,
wherein the nozzle includes a transitional section having a first cross-sectional area at an upstream portion of the transitional section and a second cross-sectional area at a downstream portion of the transitional section and wherein the first cross-sectional area is greater than the second cross-sectional area, wherein the nozzle includes a pintle disposed in the transitional section, and wherein the transitional section comprises a pathway surface and the pintle comprises a pintle surface, and wherein a segment of the pathway surface is substantially equidistant from a corresponding segment of the pintle surface,
wherein the pintle is attached to the nozzle via a plurality of tabs and wherein each tab of the plurality of tabs extends through a pathway formed by the pathway surface of the transitional section and the pintle surface of the pintle and wherein each tab is at least partially configured as an airfoil.

2. The ventilation system of claim 1, wherein the nozzle is configured to accelerate the flow of air as the flow of air flows through the nozzle, thereby forming the stream of air.

3. The ventilation system of claim 1, wherein the first cross-sectional area and the second cross-sectional area each have a generally circular configuration.

4. The ventilation system of claim 1, wherein the nozzle is adjustable.

5. The ventilation system of claim 4, wherein the nozzle has a generally spherical periphery.

6. The ventilation system of claim 1, wherein the valve is an electronically actuatable valve.

7. The ventilation system of claim 1, wherein the conduit comprises a hose.

8. A ventilation system for ventilating a passenger compartment of an aircraft, the ventilation system comprising:
a nozzle adapted to be mounted proximate an interior of the aircraft and configured to direct a stream of air into the passenger compartment;

a valve spaced apart from the nozzle and positioned upstream of the nozzle, the valve configured to control a flow of air to the nozzle;

a conduit fluidly coupling the valve to the nozzle, the conduit configured to convey the flow of air from the valve to the nozzle; and a muffler fluidly coupled with the conduit such that the flow of air passes through the muffler, the muffler configured to absorb sound energy from the flow of air when the flow of air flows through the muffler, wherein the nozzle includes a transitional section having a first cross-sectional area at an upstream portion of the transitional section and a second cross-sectional area at a downstream portion of the transitional section and wherein the first cross-sectional area is greater than the second cross-sectional area, wherein the nozzle includes a pintle disposed in the transitional section, and wherein the transitional section comprises a pathway surface and the pintle comprises a pintle surface, and wherein a segment of the pathway surface is substantially equidistant from a corresponding segment of the pintle surface, wherein the pintle is attached to the nozzle via a plurality of tabs and wherein each tab of the plurality of tabs extends through a pathway formed by the pathway surface of the transitional section and the pintle surface of the pintle and wherein each tab is at least partially configured as an airfoil.

9. The ventilation system of claim 8, wherein the muffler is a straight-through muffler.

10. The ventilation system of claim 8, wherein the muffler is disposed between a first section of the conduit and a second section of the conduit.

11. A method of assembling a ventilation system for ventilating a passenger compartment of an aircraft, the method comprising the steps of:

gathering a valve, a conduit, and a nozzle, wherein the nozzle includes a transitional section having a first cross-sectional area at an upstream portion of the transitional section and a second cross-sectional area at a downstream portion of the transitional section and wherein the first cross-sectional area is greater than the second cross-sectional area, wherein the nozzle includes a pintle disposed in the transitional section, and wherein the transitional section comprises a pathway surface and the pintle comprises a pintle surface, and wherein a segment of the pathway surface is substantially equidistant from a corresponding segment of the pintle surface, attaching the pintle to the nozzle via a plurality of tabs and extending each tab of the plurality of tabs through a pathway formed by the pathway surface of the transitional section and the pintle surface of the pintle and configuring each tab at least partially as an airfoil;

mounting the nozzle proximate the passenger compartment of the aircraft such that the nozzle is arranged to vent into the passenger compartment;

positioning the valve proximate the passenger compartment in a location spaced apart from the nozzle; and connecting the conduit between an output of the valve an inlet of the nozzle such that the valve and nozzle are fluidly coupled with one another via the conduit and configured to provide ventilation to the passenger compartment of the aircraft.

12. The method of claim 11, further comprising the steps of gathering a muffler and connecting the muffler to the conduit such that the muffler is disposed between the valve and the nozzle and such that the muffler is fluidly coupled with both the nozzle and the valve.

* * * * *